(12) United States Patent
Bastide et al.

(10) Patent No.: US 10,748,003 B2
(45) Date of Patent: Aug. 18, 2020

(54) MITIGATION OF AUGMENTED REALITY MARKUP BLINDNESS

(71) Applicant: INTERNATIONAL BUSINESS MACHINES CORPORATION, Armonk, NY (US)

(72) Inventors: Paul R. Bastide, Boxford, MA (US); Liam S. Harpur, Dublin (IE); Matthew E. Broomhall, Goffstown, NH (US); Lin Sun, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 76 days.

(21) Appl. No.: 16/130,127

(22) Filed: Sep. 13, 2018

(65) Prior Publication Data

US 2020/0089952 A1   Mar. 19, 2020

(51) Int. Cl.
| | |
|---|---|
| *G06K 9/00* | (2006.01) |
| *G06K 19/00* | (2006.01) |
| *H04N 21/81* | (2011.01) |
| *G06T 19/00* | (2011.01) |
| *G06T 5/00* | (2006.01) |
| *G06T 7/70* | (2017.01) |
| *G06T 13/20* | (2011.01) |

(52) U.S. Cl.
CPC ......... *G06K 9/00671* (2013.01); *G06T 5/002* (2013.01); *G06T 7/70* (2017.01); *G06T 13/20* (2013.01); *G06T 19/006* (2013.01); *H04N 21/812* (2013.01)

(58) Field of Classification Search
None
See application file for complete search history.

(56) References Cited

U.S. PATENT DOCUMENTS 9,053,154 B1 *   6/2015   Shah ................. G06F 16/24578
2015/0035822 A1   2/2015   Arsan et al.
(Continued)

OTHER PUBLICATIONS

Metz, "Augmented-Reality Glasses Could Help Legally Blind Navigate", Startup VA-ST thinks its depth-sensing glasses can help people with little sight get around more easily, Jun. 15, 2015, 7 pages, https://www.technologyreview.com/s/538491/augmented-reality-glasses-could-help-legally-blind-navigate/.
(Continued)

*Primary Examiner* — Matthew Salvucci
(74) *Attorney, Agent, or Firm* — Rakesh Roy (57) ABSTRACT

Embodiments of the present invention disclose a method, computer program product, and system for avoiding augmented reality blindness during an augmented reality session via an augmented reality device used by a user. In the method, computer program product, and system a set of visual representations within the augmented reality session is detected. A set of labeling objects is applied to the set of visual representations within the augmented reality session. A subset of labeling objects and associated visual representation within a display view of the augmented reality device are recorded in a history table. A blindness quotient based on the history table of recorded labeled objects and associated visual representation is calculated. In response to the calculated blindness quotient exceeding a threshold, the set of labeling objects within the display view of the augmented reality device are modified.

15 Claims, 4 Drawing Sheets

(56) References Cited

U.S. PATENT DOCUMENTS

2016/0050465 A1    2/2016   Zaheer et al.
2017/0200296 A1    7/2017   Jones et al.

OTHER PUBLICATIONS

Rogerson, "The Rise and Fall of the Pop-Up Ad- and What's Set to Replace it", Ve, Posted Jul. 11, 2016 In Onsite engagement, VePanel, pp. 1-10, https://www.veinteractive.com/blog/the-rise-and-fall-of-the-pop-up-ad-and-whats-set-to-replace-it/.

* cited by examiner

MITIGATION OF AUGMENTED REALITY MARKUP BLINDNESS

BACKGROUND

The present invention relates generally to the field of augmented reality wearable devices and more particularly to mitigating digital markup blindness within a digital reality session.

Many Augmented Reality (AR) wearable vendors are driving changes in user behavior by presenting contact information, combining reality with games, and overlaying map information with a real-world view. Augmented reality's combination of live views overlaid with digital flags and markers enables useful information to be presented and acted upon by a user in real time. However, with repetitive viewing of the same flags and markers, a blindness develops. A similar issue arises in webpage displays where user's attention to advertising in selected banners diminishes over time, also known as banner blindness. As user engagement with augmented reality, virtual reality, and mixed reality become more ubiquitous, blindness to digital flags and markers or "markup blindness" may increase.

SUMMARY

Embodiments of the present invention disclose a method, computer program product, and system for avoiding augmented reality blindness during an augmented reality session via an augmented reality device used by a user. In the method, computer program product, and system a set of visual representations within the augmented reality session is detected. A set of labeling objects is applied to the set of visual representations within the augmented reality session. A subset of labeling objects and associated visual representation within a display view of the augmented reality device are recorded in a history table. A blindness quotient based on the history table of recorded labeled objects and associated visual representation is calculated. In response to the calculated blindness quotient exceeding a threshold, the set of labeling objects within the display view of the augmented reality device are modified.

DETAILED DESCRIPTION

Embodiments of the present invention relate to the field of computing, and more particularly to mitigating digital markup blindness within a digital reality session. The following described exemplary embodiments provide a system, method, and program product to, among other things, label objects in a digital display view, record the labeled objects and visual representation, calculate a blindness quotient based on the labeled objects and visual representation, and change the augmented reality display of the object (or label) such that the blindness quotient is reduced. Therefore, the present embodiment has the capacity to improve the technical field of augmented reality by increasing the efficiency of integration of digital labels and markers into the visual layers of a display of a digital reality session via an augmented reality device. It should be appreciated by those in the art the invention disclosed below may also be performed in a totally digital environment via a virtual reality device.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In digital reality sessions, various objects, labels, and markers are displayed within layers generated and communicated to a display on a digital reality device. Digital reality displays may combine live views, for example, via sensor, camera input, or open visual ports to the outside environment, with digital flags and markers that enable information to be presented to a user in behind, in conjunction, or overlaid with real world objects. A mixed reality solution may allow increased user interaction and engagement as the digital experience is anchored with real world views. It should be appreciated that as digital reality device use increases, development of augmented reality assistance to users may also become more prevalent.

As user engagement increases, markup blindness may occur where the digital elements are passively or actively ignored by the user, limiting the effectiveness of information disseminated during a session. It may be advantageous to mitigate a blindness to digital flags and markers, or lessen "markup blindness," in a digital reality environment, or augmented reality. It may be advantageous to avoid digital reality, virtual reality, augmented reality, or mixed reality, markup blindness due to repeated views of the same labels. Mitigation of markup blindness may lead to better user satisfaction with downstream applications and more engagement with the applications and advertising. It may also be advantageous to allow developers the ability to customize applications based on preferences, for example, blindness mitigation may be prioritized based on an economic model. For example, advertisement labels with the greatest potential revenue are engaged in the most aggressive mitigation, or health related markers related to a user's profile or medical record being made more prominent.

Figure 1:
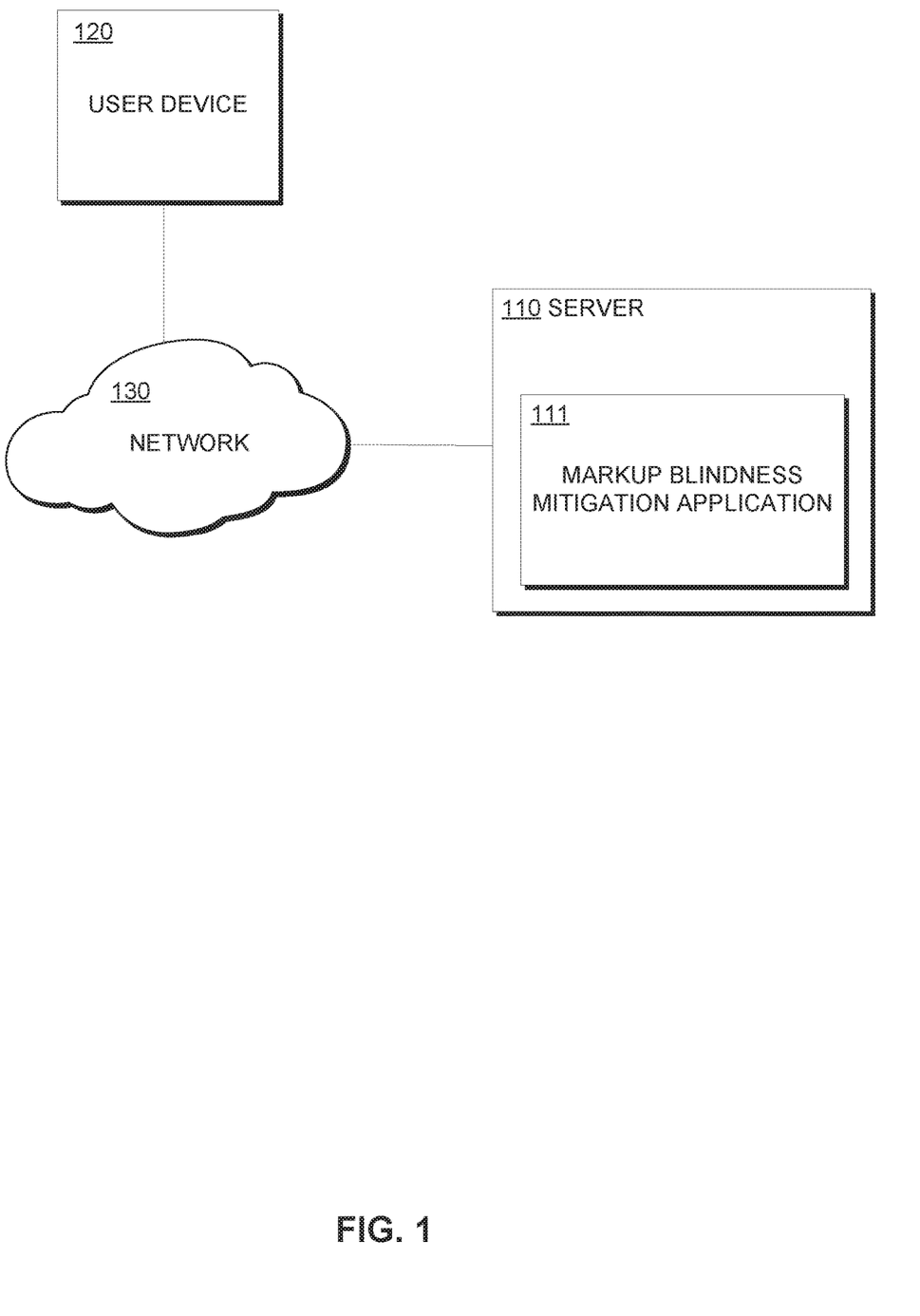
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. Distributed data processing environment 100 includes server 110 and user device 120, all interconnected via network 130.

Server 110 and user device 120 be a laptop computer, tablet computer, netbook computer, personal computer (PC), a desktop computer, a smart phone, or any programmable electronic device capable of communicating via network, for example, network 130 and with various components and devices within distributed data processing environment 100. Server 110 includes markup blindness mitigation application 111. Markup blindness mitigation application 111 may communicate with user device 120 and provide an audio or visual overlay to the augmented reality or virtual reality experience of the user. Server 110 and user device 120 may include internal and external hardware components, as depicted and described in further detail with respect to FIG. 4.

The user device 120 may be any programmable electronic device capable of display where the display is capable of providing a digital reality experience for the user. For example, the user device 120 may include, among other things, a virtual reality headset that provides a virtual reality experience for the wearer. Virtual reality headsets are widely used with computer games, but they are also used in other applications, including simulators and trainers. They include a stereoscopic head-mounted display (providing separate images for each eye), stereo sound, and head motion tracking sensors (which may include gyroscopes, accelerometers, structured light systems, cameras, etc.). Some virtual reality headsets also have eye tracking sensors and gaming controllers.

The user device 120 may also be an augmented reality device. Augmented reality is a live direct or indirect view of a physical, real-world environment whose elements are augmented by computer-generated sensory input such as sound, video, graphics or Global Positioning System data. It is related to a more general concept called computer-mediated reality, in which a view of reality is modified (possibly even diminished rather than augmented) by a computer. Augmented reality enhances one's current perception of reality, whereas in contrast, virtual reality replaces the real world with a simulated one. Augmentation techniques are typically performed in real time and in semantic context with environmental elements, such as overlaying supplemental information like scores over a live video feed of a sporting event Like above, both virtual reality devices and augmented reality devices may be referred to collectively as digital reality devices for purposes of the following description.

It should be appreciated that user device 120 may be any programmable electronic device capable of conveying real world environments, completely virtual environments, or augmented reality environments.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between server 110 and user device 120 along with any other components in distributed data processing environment 100.

In an embodiment, the user device 120 may operate as a digital reality display device while the markup blindness mitigation application 111 may run primarily on the server 110. In an alternative embodiment, the markup blindness mitigation application 111 may run primarily on the user device 120 while the server 110 may be used for processing and storage of data used by the markup blindness mitigation application 111. It should be noted that the markup blindness mitigation application 111 may be a standalone program or may be integrated into a larger application.

It should also be noted, that processing for the markup blindness mitigation application 111 may be shared amongst the user device 120 and the server 110 in any ratio. In another embodiment, the markup blindness mitigation application 111 may operate on more than one server, user device, or some combination of servers and user devices, for example, a plurality of user devices 120 communicating across the network 130 with a single server 110. In another embodiment, for example, the markup blindness mitigation application 111 may operate on a plurality of servers 110 communicating across the network 130 with a plurality of user devices 120. Alternatively, the markup blindness mitigation application 111 may operate on a network server communicating across the network with server 110 and one or more user devices 120.

In various embodiments of the present invention, markup blindness mitigation application 111 may act generally to label objects in a user's view during a digital reality session, recording the labeled objects and a visual representation of the labeled object, calculate a blindness quotient associated with the labeled object, and modify the digital reality display of the object based on the calculated blindness quotient.

In various embodiments, markup blindness mitigation application 111 detects the start of a digital reality session, for example, by receiving a digital reality start command, or receiving input from sensors indicating the user is wearing the digital reality device, for example, gyroscopes, accelerometers, and/or a global positioning system (GPS), in communication with or physically attached to the digital reality device. In various embodiments, markup blindness mitigation application 111 may determine objects within the view of a user engaged in the digital reality session, using computer vision and/or machine learning to identify objects in the view. In various embodiments, the objects detected by markup blindness mitigation application 111 may be based on user preferences or social media metadata mined from various social media accounts associated with the user, for example, if the user has a preference for restaurants and a dislike of animals markup blindness mitigation application 111 may detect objects associated with food and ignore objects associated with animals as those objects come into the user's view during a digital reality session.

In various embodiments, markup blindness mitigation application 111 applies labels to detected objects, in a view, by mapping labels, or descriptions, to the detected objects in the real-world view. Markup blindness mitigation application 111 may record the labeled objects and associated description of the labeled object, a count of the objects associated with the label, and a visual representation of the labeled object in a history table in memory or remote data store. In various embodiments, markup blindness mitigation application 111 may calculate the blindness quotient based on a frequency value of the object in the view, where if the frequency is above a threshold, markup blindness mitigation application 111 modifies the labeled object in the view of user, such that the blindness quotient is reduced. Markup blindness mitigation application 111 may modify the labeled object via a generated layer to change how the labeled object is perceived by the user in the digital reality display by, for example, changing the perceived shape of the labeled object, changing the perceived shape of the label associated with the labeled object, overlaying an animation over the labeled object, or inversing the labeled object or associated label. It should be appreciated that developers may employ various modifications to the labeled object or the label associated with the labeled object based on ingested medical publications that indicate possible methods to gain a user's attention.

Figure 2:
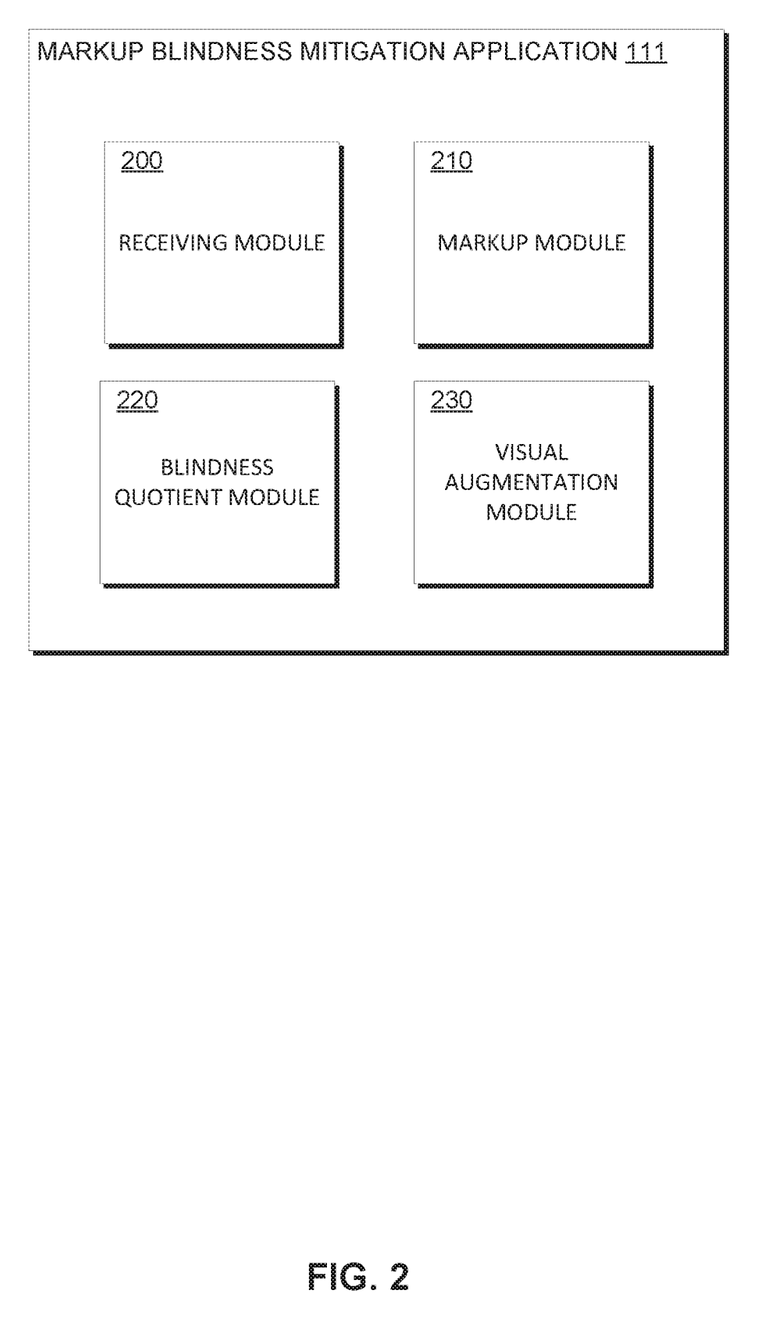
FIG. 2 is a functional block diagram illustrating the components of an application within the distributed data processing environment, in accordance with an embodiment of the present invention.

FIG. 2 is a functional block diagram illustrating the components of an application, for example, markup blindness mitigation application 111, within server 110, within the distributed data processing environment 100, in accordance with an embodiment of the present invention. Markup blindness mitigation application 111 includes receiving module 200, markup module 210, blindness quotient module 220, and visual augmentation module 230.

In various embodiments, receiving module 200 receives activity data associated with the user, including GPS data, via sensors or monitors via user device 120. In various embodiments, activity data is received via wearable devices or the digital reality device. It should be appreciated that the wearable or digital reality device is any device capable of detecting and mapping user movement to the activity type. For example, a first set of activity data received from various sensors can be determined to be swimming and a second set of activity data can be determined to be running. In various embodiments, the sensors and activity type determination may occur within receiving module 200. In various embodiments, receiving module 200 may also detect activity based on an analysis of social media data or user profile data, for example, a calendar.

In various embodiments, receiving module 200 receives user profile data that includes at least a set of geographic data associated with the user. For example, receiving module 200 receives the login credentials of a user social media profile that includes a set of geographical data received from a Global Positioning System on the user device 120 or on another device capable of communicating the user's location. The set of profile data may further include data associated with login credentials associated with user input or a user profile. In various embodiments, the set of user profile data may be data-mined from one or more social media websites, for example, by user device 120.

In various embodiments, receiving module 200 may receive a command that a digital reality session has started. Receiving module 200 may receive visual data representing the users real-world view in real time. Receiving module 200 may dynamically detect objects in the users view based on a count of the number of detected objects in the view of the user, user preferences, GPS data, the activity type the user is engaged in, or some combination thereof. For example, if the user is determined to be walking by receiving module 200, receiving module 200 may detect objects within a threshold of 10 feet. However, if the user is determined, for example, to be riding a bicycle, receiving module 200 may detect objects beyond a threshold of 10 feet and within a threshold of 50 feet. In various embodiments, receiving module 200 may detect objects crossing one or more thresholds based on the various received data discussed above. Receiving module 200 may communicate detected objects and user activity data to markup module 210.

In various embodiments, markup module 210 receives user activity data, including geographic data and detected objects within the user's view during the digital reality session from receiving module 200. Markup module 210 may generate labels and map the generated labeled to the detected objects. For example, markup module 210 may generate a history table that includes the detected objects and the corresponding labels associated with the detected objects. In various embodiments, generated labels may be based on geography and received GPS data, for example a label of a general location or "relative location labeling," predetermined labels via object recognition software, or previously machine learned and computer vision determined labels, and/or user input selection or "tags" of objects in the display from previous digital reality sessions or the current session.

In various embodiments, markup module 210 generates object labels and overlays the label onto the view of the user within the digital reality session via a display of projection tracking the X-Y position, the frame of the label, and the image details in order to maintain a smooth real time label in a correct position relative to the perspective and view of the user. In various embodiments, markup module 210 may record, and store in a data store, the labeled objects and associated visual representation, or screen capture of the object, in a history table for machine learning or other future analysis. For example, if markup module 210 receives an animal as a detected object, markup module 210 may store the name of the detected animal, for example, "dog," as well as an occurrence count of the detected animal, for example, "dog count=4," and an image representation, for example, a screen capture of the first dog detected to be associated with the label "dog." In various embodiments, the history table may also store geographic locations and associated GPS data associated with a labeled object and associated category of the object, for example, the geographical location of a building and its corresponding category, for example, "museum," in order to increase the efficiency of mitigating blindness to users that indicate on social media an enjoyment of museums.

In various embodiments, markup module 210 may periodically clear the history table depending on user or developer preferences such that the objects and associated labels are stored for a set period of time, for example, 1 year for commercial buildings, 1 day for labels associated with an event, or 1 min for labels associated with a passing individual or other temporary entity.

In various embodiments, markup module 210 may communicate the object labels, data associated with the label generation, and corresponding detected objects to blindness quotient module 220.

In various embodiments, blindness quotient module 220 receives labeled objects and calculated blindness quotients associated with the received labeled objects. In various embodiments, the blindness quotients are calculated based on the labeled objects, the frequency of the labels, and the data associated with the size, position, frame, and visualization of the label or marker. For example, a standard blindness quotient of "1" may be associated with all labeled objects then blindness quotient module 220 multiplies the standard blindness quotient by the number occurrences of the object in the user's field of view, or second blindness quotient, and multiplies the second blindness quotient by values associated with the size, position, frame, and visualization of the label to calculate the final blindness quotient.

In various embodiments, blindness quotient module 220 communicates the calculated final blindness quotient and all associated labeled object data to visual augmentation module 230.

In various embodiments, visual augmentation module 230 receives a final blindness quotient and associated labeled object data from blindness quotient module 220. If the calculated final blindness quotient exceeds a blindness threshold, visual augmentation module 230 may modify the label associated with the labeled object. In various embodiments, the threshold may be set by an administrator, a user, or determined using machine learning and computer vision. In various embodiments, visual augmentation module 230 may query computer resource monitors within server 110 to determine the load modifying the labels would put on server 110. If the potential load of modifying the labels exceeds a computer resource threshold, visual augmentation module 230 may modify the blindness threshold to increase the efficiency of label modification by only modifying labels when there are available computer resources. It should be appreciated that the resource threshold may be based on computer resources of server 110, user device 120, or network 130, for example, network bandwidth.

In various embodiments, the blindness threshold may be modified based on user interaction, or lack of user interaction, with a generated label or detected object. It should be appreciated that visual augmentation module 230 may query receiving module periodically or continuously for updated in the user's field of view and detected objects and modify the blindness threshold based on the number of new detected objects in the user's field of view.

In various embodiments, visual augmentation module 230 may modify the label associated with the labeled object by changing the perceived physical attributes of the label as displayed in the digital reality view via the digital reality device. Visual augmentation module 230 may modify the label until it is determined that the blindness quotient is reduced. A reduction of the blindness quotient may be determined via user input selections or received user interaction with the label.

In various embodiments, visual augmentation module 230 changes the physicality of the label by changing the shape of the label, for example the user interacts with squares more often than circles so visual augmentation module 230 modifies a label with an associated blindness quotient above the blindness threshold from a circle to a square. In various embodiments, visual augmentation module 230 may animating a static label or freeze an animated label, for example, overlaying a "pop" animation over a label to draw the user's attention or stopping a rotation animation such that the front of the label is flush to the user. In various embodiments, visual augmentation module 230 may overlay the labeled object with a label emulating the label object with some modification, for example, if the logo of a store is an angry face, visual augmentation module 230 may overlay the same face of the logo but with a smile in order to increase user interaction.

In various embodiments, visual augmentation module 230 may communicate questionnaires or input selection options to determine user preferences and potential interest. Visual augmentation module 230 may also communicate removal options to determine if the user is overwhelmed or if the view is too cluttered in order to mitigate a potential option paralysis contributing to the blindness. Therefore, visual augmentation module 230 can determine the optimal rate of labeling objects and may dynamically add or remove labels to the visual display overlay depending on the user preferences and historical data on user engagement.

It should be appreciated that other factors may be used by visual augmentation module 230 to determine the optimal modifications to the labels such as label size, label colors, perceived label distance, label shape perspective, label permanence, and/or label transparency and opacity.

Figure 3:
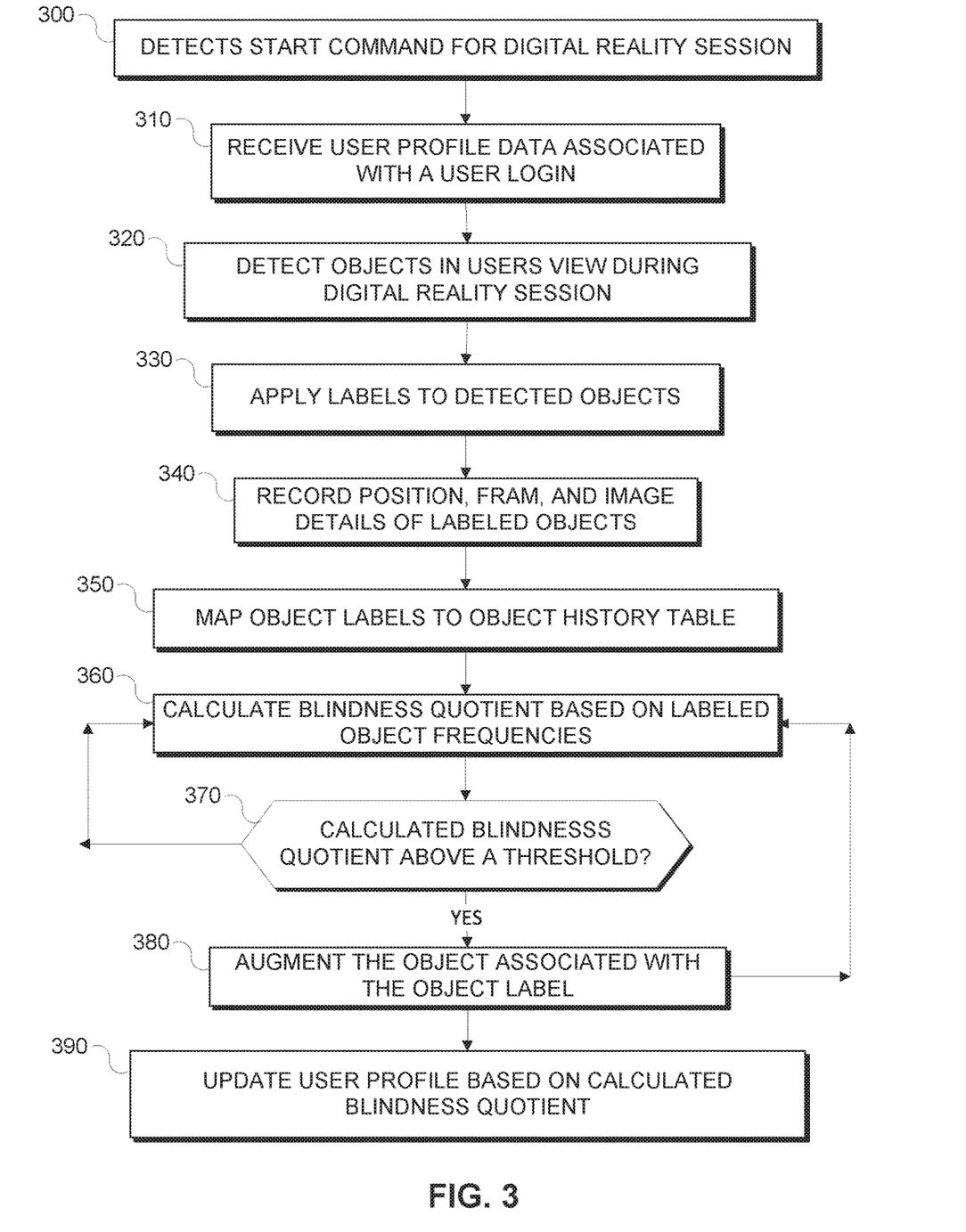
FIG. 3 is a flowchart depicting operational steps of an application, on a server computer within the data processing environment of FIG. 1, in accordance with an embodiment of the present invention.

FIG. 3 is a flowchart depicting operational steps of markup blindness mitigation application 111, on server 110 within data processing environment 100 of FIG. 1, in accordance with an embodiment of the present invention. Receiving module 200 detects a start command for a digital reality session associated with a user identification (block 300). Receiving module 200 receives user profile data associated with the user identification (block 310) from a datastore or user device, for example, user device 120. In various embodiments, receiving module 200 communicates the user identifications and associated social media data to markup module 210.

Markup module 210 analyzes the received profile data and detects the type of activity the person is engaged and detects objects in the users view during the detected activity (block 320) for each associated user engaged in the digital reality session. In various embodiments, markup module 210 determines and applies labels to the detected objects (block 330) and determines the position, frame, and any image details to the labeled objects (block 340). Markup module 210 maps the labels associated with the labeled objects and apps the object labels to an object history table (block 350). Markup module 210 communicates the object history table to blindness quotient module 220.

Blindness quotient module 220 receives the object history table from markup module 210. Blindness quotient module 220 calculates a blindness quotient associated with each object label in the object history table based on the frequencies of the object labels in the history table (block 360). If the calculated blindness quotient for an object label is above a threshold (block 370 "YES" branch), blindness quotient module 220 communicates the object label and associated blindness quotient to visual augmentation module 230. If the calculated blindness quotient for an object label is below a threshold (block 370 "NO" branch), blindness quotient module 220 periodically updates the blindness quotient associated with an object label. In various embodiments, the threshold may be set by an administrator, a user, at a system level, or calculated based on load on the system of the user device 120 or server 110. In further embodiments, the threshold may be determined by machine learning based on the inactivity or activity patterns of corresponding markers or based on the total number of markers in a user's view.

Visual augmentation module 230 may receive object labels and associated blindness quotients from blindness quotient module 220 and augment the augmented reality display of the object (or label) such that the blindness quotient is reduced. Visual augmentation module 230 may augment an object in various ways (block 380), for example, changing an object shape (changing the label from Square to Circle), animating the label to increase awareness of the label (adding an animation that "pops" the label), or overlaying the object with the inverse object (changing a smile to frown in a facial object). Various other augmentations may also occur the visual display around an object or object label, for example, blurring or blooming of the display surrounding an object or object label.

Visual augmentation module 230 updates the user profile based on the response to the object augmentations based on the blindness quotient (block 390). In various embodiments, visual augmentation module 230 adds a preferred view which highlights the items of potential high interest to the user in case the default view is too cluttered with labels. Alternatively, visual augmentation module 230 may offer alternative views of varying blindness levels much like a varying glasses prescription during an eye example aids in the patient determining the clearest picture. In various embodiments, visual augmentation module 230 dynamically augment the label by determining how big or what color the label should be based on the distance the user is viewing the label (dynamic perspective shit of the label).

In various embodiments, visual augmentation module 230 may communicate option selections, or questionnaires, to the user in order to modify the blindness quotient based on a received user input selection. Visual augmentation module 230 may dynamically modify the blindness quotient based on user input selections, modify the labeled object in the view of the user and communicate a next user option for further modification. This feedback may enable visual augmentation module 230 to maintain user engagement while optimizing the labeled object modifications and optimizing the blindness mitigation in order to increase the efficiency of the information displayed to the user via the digital reality device display.

In various visual augmentation module 230 may add behavior of other augmented reality users when determining what labels to overlay in the current user's view by detecting other users engaged in digital realty sessions via network 130. For example, user's may provide input via questionnaires or reviews where 78% of previous users remove a geo-tag from an object label, corresponding to a restaurant, because the name displayed on the label indicated the location of the restaurant, not add value to the user's context. In response to the user input, visual augmentation module 230 may remove the geo-tag from the label overlaid in the current user's view.

Figure 4:
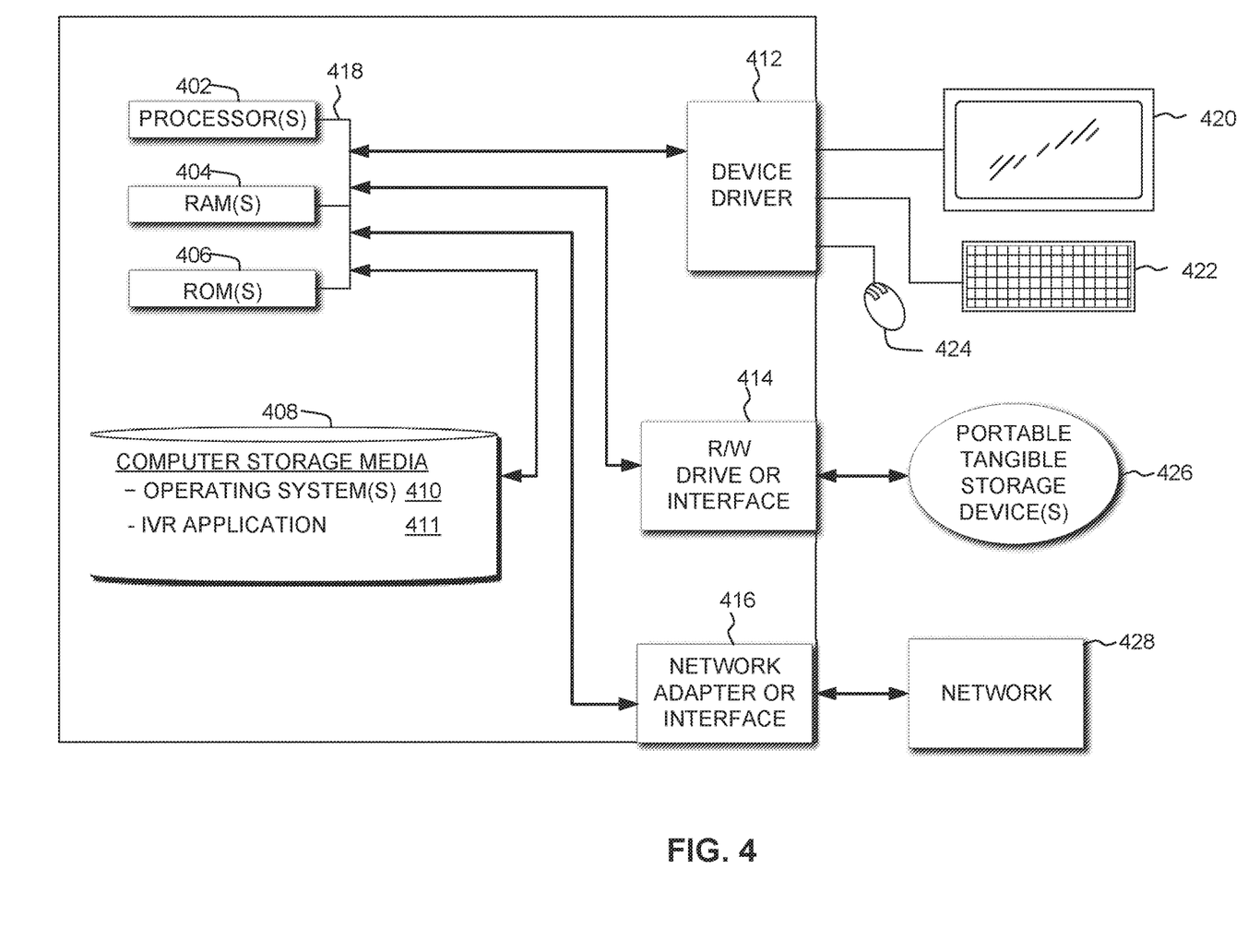
FIG. 4 depicts a block diagram of components of the server computer executing the application, in accordance with an embodiment of the present invention.

FIG. 4 depicts a block diagram of components of Server 110 and user device 120 of distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110 and user device 120 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, markup blindness mitigation application 111, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 and user device 120 may also include a R/W drive or interface 414 to read from and write to one or more portable computer readable storage media 426. Application programs 411 on server 110 and user device 120 may be stored on one or more of the portable computer readable storage media 426, read via the respective R/W drive or interface 414 and loaded into the respective computer readable storage media 408.

Server 110 and user device 120 may also include a network adapter or interface 416, such as a TCP/IP adapter card or wireless communication adapter (such as a 4G wireless communication adapter using OFDMA technology) for connection to a network 428. Application programs 411 on server 110 and user device 120 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110 and user device 120 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for avoiding augmented reality blindness during an augmented reality session via an augmented reality device used by a user, the method comprising:
   detecting a set of visual representations within the augmented reality session;
   applying a set of labeling objects to the set of visual representations within the augmented reality session;
   recording a subset of labeling objects and associated visual representation within a display view of the augmented reality device in a history table;
   calculating a blindness quotient based on the history table of recorded labeled objects and associated visual representation; and
   in response to the calculated blindness quotient exceeding a threshold, modifying the set of labeling objects within the display view of the augmented reality device, wherein modifying the labeling objects within the display view of the augmented reality device comprises:
   modifying a shape of the labeling object;
   animating the labeling object;
   overlaying the labeling object with its inverse;
   blurring an area around the labeling object, wherein a first size of the blurred area is below a threshold; and blooming the area around the labeling object, wherein a second size of the bloomed area is below a threshold.

2. The method of claim 1, further comprising:
calculating a modified blindness quotient based on the modified set of labeling objects within the display view of the augmented reality device; and
in response to determining the modified blindness quotient value is less than the calculated blindness quotient, displaying the modified labeling objects within the display view of the augmented reality device.

3. The method of claim 1, wherein the labeling objects within the display view further comprises metadata, wherein the labeling objects metadata includes one or more of:
geographic location data;
computer vision object recognition data; and
user visual tags.

4. The method of claim 1, wherein detecting the set of visual representations within the augmented reality session further comprises:
recording a set of position data within a view associated with the visual representation;
generating a labeling object frame associated with the visual representation; and
in response to datamining textual data associated with the visual representation, generating textual image details for display associated with the visual representation.

5. The method of claim 1, wherein recording a subset of labeling objects and associated visual representation within the display view of the augmented reality device in the history table further comprises:
storing an identification associated with each of the labeling object; and
determining an occurrence count associated with each of the labeling object.

6. A computer program product for avoiding augmented reality blindness during an augmented reality session via an augmented reality device used by a user, the computer program product comprising:
one or more computer-readable storage media and program instructions stored on the one or more computer-readable storage media, the program instructions comprising:
instructions to detect a set of visual representations within the augmented reality session;
instructions to apply a set of labeling objects to the set of visual representations within the augmented reality session;
instructions to record a subset of labeling objects and associated visual representation within a display view of the augmented reality device in a history table;
instructions to calculate a blindness quotient based on the history table of recorded labeled objects and associated visual representation; and
in response to the calculated blindness quotient exceeding a threshold, instructions to modify the set of labeling objects within the display view of the augmented reality device, wherein instructions to modify the labeling objects within the display view of the augmented reality device comprises:
instructions to modify a shape of the labeling object;
instructions to animate the labeling object;
instructions to overlay the labeling object with its inverse;
instructions to blur an area around the labeling object, wherein a first size of the blurred area is below a threshold; and
instructions to bloom the area around the labeling object, wherein a second size of the bloomed area is below a threshold.

7. The computer program product of claim 6, further comprising:
instructions to calculate a modified blindness quotient based on the modified set of labeling objects within the display view of the augmented reality device; and
in response to instructions to determine the modified blindness quotient value is less than the calculated blindness quotient, instructions to display the modified labeling objects within the display view of the augmented reality device.

8. The computer program product of claim 6, wherein the labeling objects within the display view further comprises metadata, wherein the labeling objects metadata includes one or more of:
geographic location data;
computer vision object recognition data; and
user visual tags.

9. The computer program product of claim 6, wherein instructions to detect the set of visual representations within the augmented reality session further comprises:
instructions to record a set of position data within a view associated with the visual representation;
instructions to generate a labeling object frame associated with the visual representation; and
in response to instructions to datamine textual data associated with the visual representation, instructions to generate textual image details for display associated with the visual representation.

10. The computer program product of claim 6, wherein instructions to record a subset of labeling objects and associated visual representation within the display view of the augmented reality device in the history table further comprises:
instructions to store an identification associated with each of the labeling object; and
instructions to determine an occurrence count associated with each of the labeling object.

11. A computer system for avoiding augmented reality blindness during an augmented reality session via an augmented reality device used by a user, the computer system comprising:
one or more computer processors;
one or more computer-readable storage media;
program instructions stored on the computer-readable storage media for execution by at least one of the one or more processors, the program instructions comprising:
instructions to detect a set of visual representations within the augmented reality session;
instructions to apply a set of labeling objects to the set of visual representations within the augmented reality session;
instructions to record a subset of labeling objects and associated visual representation within a display view of the augmented reality device in a history table;
instructions to calculate a blindness quotient based on the history table of recorded labeled objects and associated visual representation; and
in response to the calculated blindness quotient exceeding a threshold, instructions to modify the set of labeling objects within the display view of the augmented reality device, wherein instructions to modify the labeling objects within the display view of the augmented reality device further comprises:

instructions to modify a shape of the labeling object;
instructions to animate the labeling object;
instructions to overlay the labeling object with its inverse;
instructions to blur an area around the labeling object, wherein a first size of the blurred area is below a threshold; and
instructions to bloom the area around the labeling object, wherein a second size of the bloomed area is below a threshold.

12. The computer system of claim 11, further comprising:
instructions to calculate a modified blindness quotient based on the modified set of labeling objects within the display view of the augmented reality device; and
in response to instructions to determine the modified blindness quotient value is less than the calculated blindness quotient, instructions to display the modified labeling objects within the display view of the augmented reality device.

13. The computer system of claim 11, wherein the labeling objects within the display view further comprises metadata, wherein the labeling objects metadata includes one or more of:
geographic location data;
computer vision object recognition data; and
user visual tags.

14. The computer system of claim 11, wherein instructions to detect the set of visual representations within the augmented reality session further comprises:
instructions to record a set of position data within a view associated with the visual representation;
instructions to generate a labeling object frame associated with the visual representation; and
in response to instructions to datamine textual data associated with the visual representation, instructions to generate textual image details for display associated with the visual representation.

15. The computer system of claim 11, wherein instructions to record a subset of labeling objects and associated visual representation within the display view of the augmented reality device in the history table further comprises:
instructions to store an identification associated with each of the labeling object; and
instructions to determine an occurrence count associated with each of the labeling object.

* * * * *